United States Patent [19]

Rush

[11] Patent Number: 4,995,306
[45] Date of Patent: Feb. 26, 1991

[54] AIR CIRCULATING SYSTEM FOR A PERSON OPERATING AN ENGINE POWERED PIECE OF AGRICULTURAL EQUIPMENT

[76] Inventor: Robert E. Rush, 560 Mellon Bridge Rd., Oxford, Ala. 36203

[21] Appl. No.: 467,010

[22] Filed: Jan. 18, 1990

[51] Int. Cl.⁵ .............................................. B60H 3/06
[52] U.S. Cl. ........................................ 98/1; 55/417; 55/473; 98/2.11
[58] Field of Search ............... 98/1, 2.11, 36, 115.4; 56/12.8, 16.9; 55/417, 473

[56] References Cited

U.S. PATENT DOCUMENTS

| | | | |
|---|---|---|---|
| 2,436,508 | 2/1948 | Fairbanks | 98/1 |
| 3,212,246 | 10/1965 | Duke | 56/12.8 |
| 3,621,834 | 11/1971 | Keuls | 55/417 X |
| 3,868,896 | 3/1975 | Doll et al. | 98/2.11 |
| 4,252,271 | 2/1981 | Green | 98/2.11 X |

Primary Examiner—Harold Joyce
Attorney, Agent, or Firm—Michael I. Kroll

[57] ABSTRACT

An air circulating system for a person operating an engine powered piece of agricultural equipment is provided and consists of a fan rotatably carried within a housing having an air inlet port and an air outlet port. The housing is mounted onto the piece of agricultural equipment adjacent the engine so that the engine can rotate the fan. An elongated duct is connected to the outlet port of the housing for directing air driven by the fan towards the person while operating the agricultural equipment to afford a degree of comfort during hot days.

5 Claims, 2 Drawing Sheets

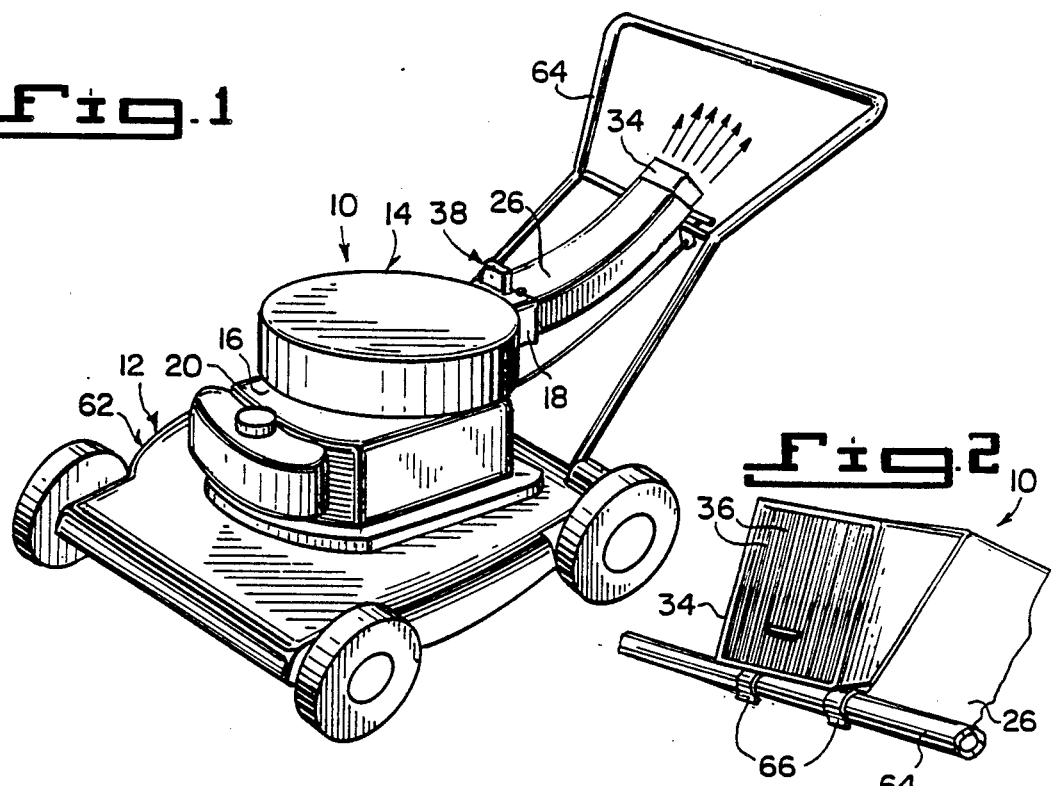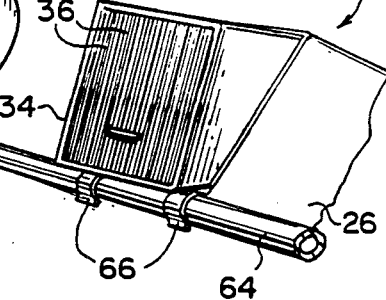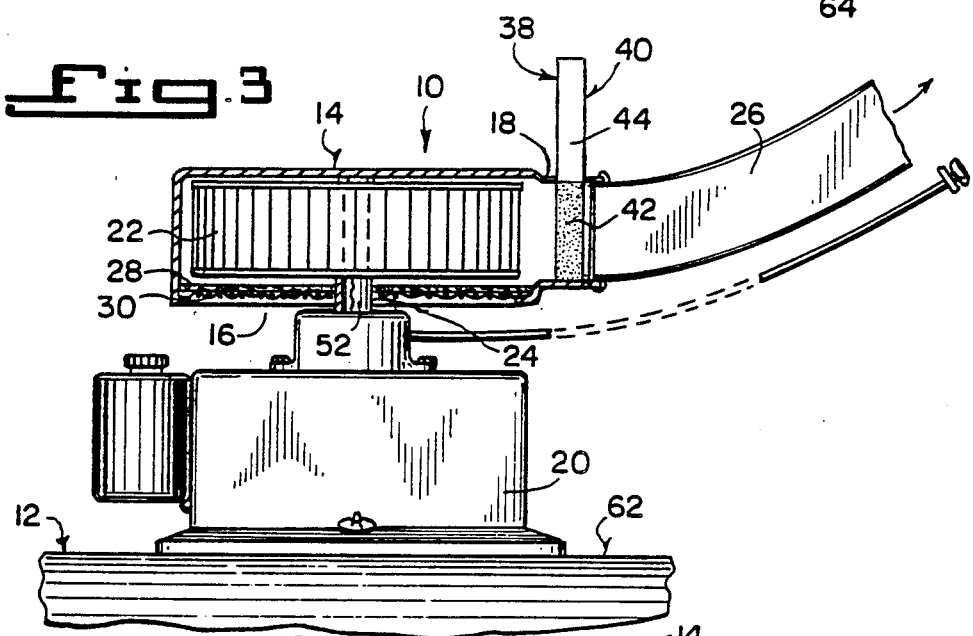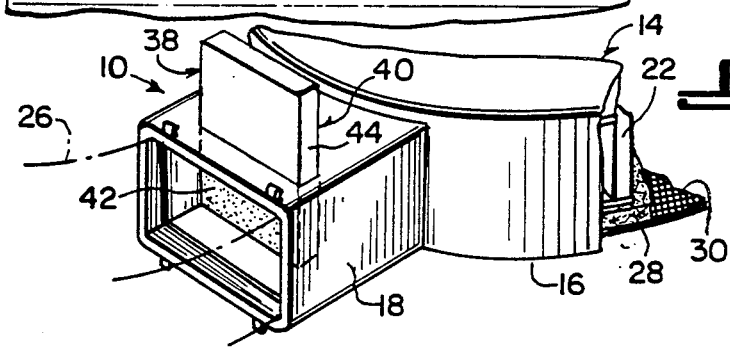

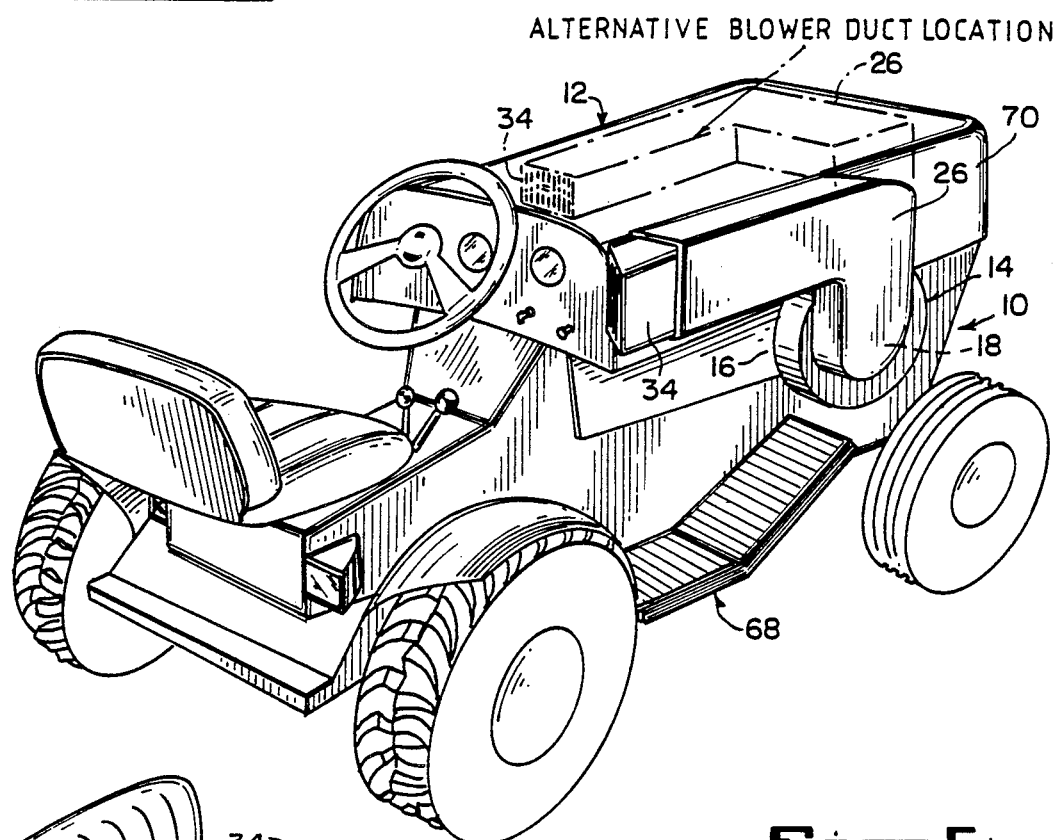
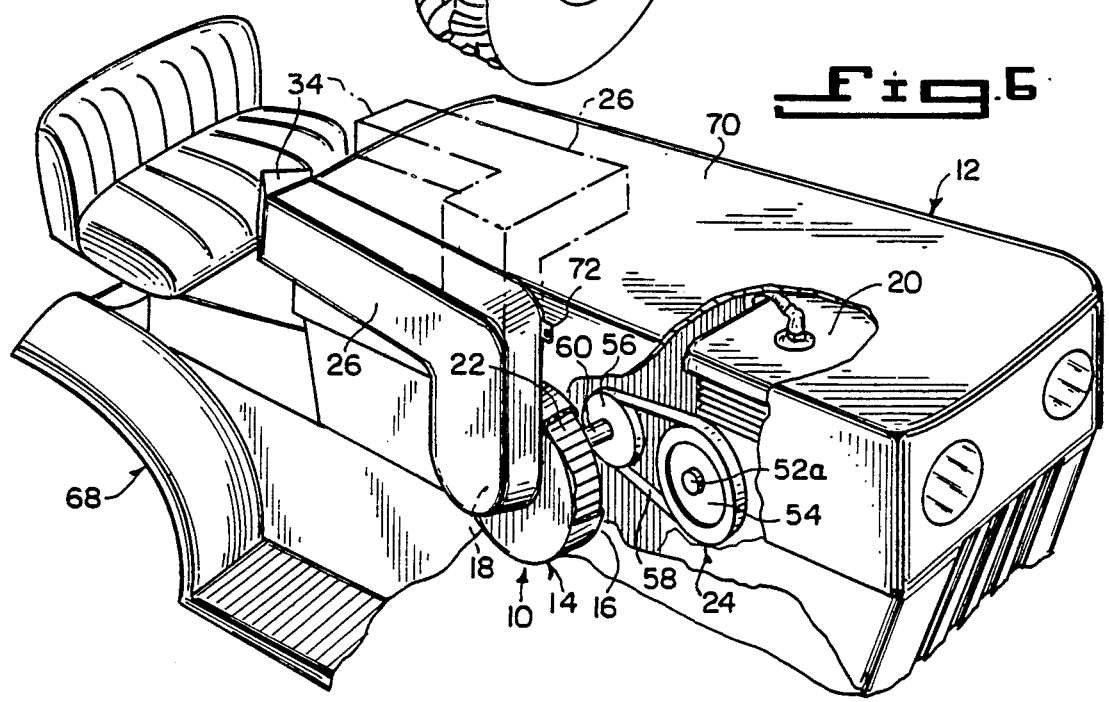

4,995,306

AIR CIRCULATING SYSTEM FOR A PERSON OPERATING AN ENGINE POWERED PIECE OF AGRICULTURAL EQUIPMENT

BACKGROUND OF THE INVENTION

1. Field of the Invention

The instant invention relates generally to air ventilation devices and more specifically it relates to an air cooling system for a person operating an engine powered piece of argicultural equipment.

2. Description of the Prior Art

Numerous air ventilation devices have been provided in prior art that are adapted to cool people operating tractor engines of agricultural vehicles and the interior of aircraft. For example, U.S. Pat. Nos. 2,817,281 to Schwan et al; 4,160,487 to Kinze et al and 4,632,019 to Whiteman all are illustrative of such prior art. While these units may be suitable for the particular purpose to which they address, they would not be as suitable for the purposes of the present invention as heretofore described.

SUMMARY OF THE INVENTION

A primary object of the present invention is to provide an air circulating system for a person operating an engine powered piece of agricultural equipment that will overcome the shortcomings of the prior art devices.

Another object is to provide an air circulating system for a person operating an engine powered piece of agricultural equipment in which the system will blow air towards the person to afford a degree of comfort during hot days.

An additional object is to provide an air circulating system for a person operating an engine powered piece of agricultural equipment in which the system will be connected to the engine of the agricultural equipment to operate a fan so as to drive filtered air through a duct towards the person to increase the rate of evaporation of perspiration and heat exchange through conduction thus keeping the person cooler while operating the agricultural equipment.

A further object is to provide an air circulating system for a person operating an engine powered piece of agricultural equipment that is simple and easy to use.

A still further object is to provide an air circulating system for a person operating an engine powered piece of agricultural equipment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the invention installed on a lawn mower.

FIG. 2 is an enlarged perspective view of the discharge outlet portion of the invention clamped onto the handle of the lawn mower.

FIG. 3 is a side view of FIG. 1 with parts broken away and in cross section.

FIG. 4 is a perspective view of the invention with parts broken away and in phantom.

FIG. 5 is a rear perspective view of another embodiment of the invention installed on a tractor.

FIG. 6 is a front perspective view of FIG. 5, with parts broken away and in cross section.

DETAILED DESCRIPTION OF THE PREFERRED EMBODIMENTS

Turning now descriptively to the drawings, in which similar reference characters denote similar elements throughout the several views, the Figures illustrate an air circulating system 10 for a person (not shown) operating an engine powered piece of agricultural equipment 12. The system 10 consists of a housing 14 having an air inlet port 16 and an air outlet port 18. The housing 14 is mounted onto the piece of agricultural equipment 12 adjacent the engine 20. A fan 22 is rotatably carried within the housing 14. A drive mechanism 24 is between the engine 20 and the fan 22 for rotating the fan. An elongated duct 26 is connected to the air outlet port 18 of the housing 14 for directing air driven by the fan 22 towards the person to increase the rate of evaporation of perspiration thus keeping the person cooler while operating the agricultural equipment 12 to afford a degree of comfort during hot days.

A filter 28 is carried in the air inlet port 16 of the housing 14 for removing dust particles from the air entering the housing 14. A screen 30 is carried in the air inlet port 16 of the housing 14 below the filter 28 for removing larger foreign particles from the air entering the housing 14. A discharge outlet member 34 is affixed to 10 the distal end of the elongated duct 26. The discharge outlet member 34 has a plurality of vertical slots 36 therein to diffuse the air driven by the fan 22 towards the person.

An apparatus 38, best seen in FIGS. 3 and 4, is provided for selectively closing the air outlet port 18 of the housing 14 so as to stop the flow of air into the elongated duct 26, when the circulation of air is not desired, debris is being blown into the air by wind or additional power consumed by the fan 22 is needed by the agricultural equipment 12. The apparatus 38, is an insertable filter gate valve 40 carried in the air outlet port 18 of the housing 14 and has a filter area 42 on one half thereof and a solid area 44 on the other half thereof. When the filter area 42 is inserted within the air outlet port 18, as shown in the drawings, more dust particles will be removed from the air leaving the housing 14. When the solid area 44 is inserted within the air outlet port 18 it will close the air outlet port 18 and stop the flow of air from within the housing 14 through the elongated duct 26.

The drive mechanism 24 as shown in FIG. 3, is an extended drive shaft 52 from the engine 20 directly connected to the fan 22. The drive mechanism 24 as shown in FIG. 6 includes an extended drive shaft 52a from the engine 20. A first pulley 54 is connected to the end of the extended drive shaft 52a. A second pulley 56 is also provided in which a continuous belt 58 goes around the first pulley 54 and the second pulley 56. A driven shaft 60 extends from the second pulley 56 and is connected to the fan 22.

As shown in FIGS. 1, 2 and 3, the piece of agricultural equipment 12 is a lawn mower 62 with a handle 64. The distal end of the elongated duct 26 includes a clamp member 66 for attachment to the handle 64 of the lawn mower 62.

As shown in FIGS. 5 and 6, the piece of agricultural equipment 12 is a tractor 68 with an engine hood 70. The elongated duct 26 includes at least one flange 72 thereon for attachment to the engine hood 70 of the tractor 68.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An air circulating system for a person operating an engine powered piece of agricultural equipment, said system comprising:
   (a) a housing having an air inlet port and an air outlet port, said housing mounted onto the piece of agricultural equipment adjacent the engine;
   (b) a fan rotatably carried within said housing;
   (c) means between the engine and said fan, for rotating said fan;
   (d) an elongated duct connected to the air outlet port of said housing for directing air driven by said fan towards the person to increase the rate of evaporation of perspiration thus keeping the person cooler while operating the agricultural equipment to afford a degree of comfort during hot days;
   (e) a filter carried in the air inlet port of said housing for removing dust particles from the air entering said housing;
   (f) a screen carried on the air inlet port of said housing below said filter for removing larger foreign particles from the air entering said housing;
   (g) a discharge outlet member affixed to the distal end of said elongated duct, said discharge outlet member having a plurality of vertical slots therein to diffuse the air driven be said fan towards the person;
   (h) means for selectively closing the air outlet port of said housing so as to stop the flow of air into said elongated duct, when the circulation of air is not desired, debris is being blown into the air by wind and additional power consumed by said fan is needed by the agricultural equipment; and
   (i) said selectively closing means is an insertable filter gate valve carried in the air outlet port of said housing having a filter area on one half thereof and a solid area on the other half thereof so that when said filter area is inserted within the air outlet port more dust particles will be removed from the air leaving said housing and when said solid area is inserted within the air outlet port it will closed the air outlet port and stop the flow of air from within said housing through said elongated duct.

2. An air circulating system as recited in claim 1, wherein said rotating means is an extended drive shaft from the engine directly connected to said fan.

3. An air circulating system as recited in claim 1, wherein said rotating means includes:
   (a) an extended drive shaft from the engine;
   (b) a first pulley connected to the end of said extended drive shaft;
   (c) a second pulley;
   (d) a continuous belt around said first pulley and said second pulley; and
   (e) a driven shaft extending from said second pulley connected to said fan.

4. An air circulating system as recited in claim 1, wherein the piece of agricultural equipment is a lawn mower with a handle and the distal end of said elongated duct includes a clamp member for attachment to the handle of the lawn mower.

5. An air circulating system as recited in claim 1, wherein the piece of agricultural equipment is a tractor with an engine hood and the elongated duct includes at least one flange thereon for attachment to the engine hood of the tractor.

* * * * *